United States Patent Office 3,460,180
Patented Aug. 12, 1969

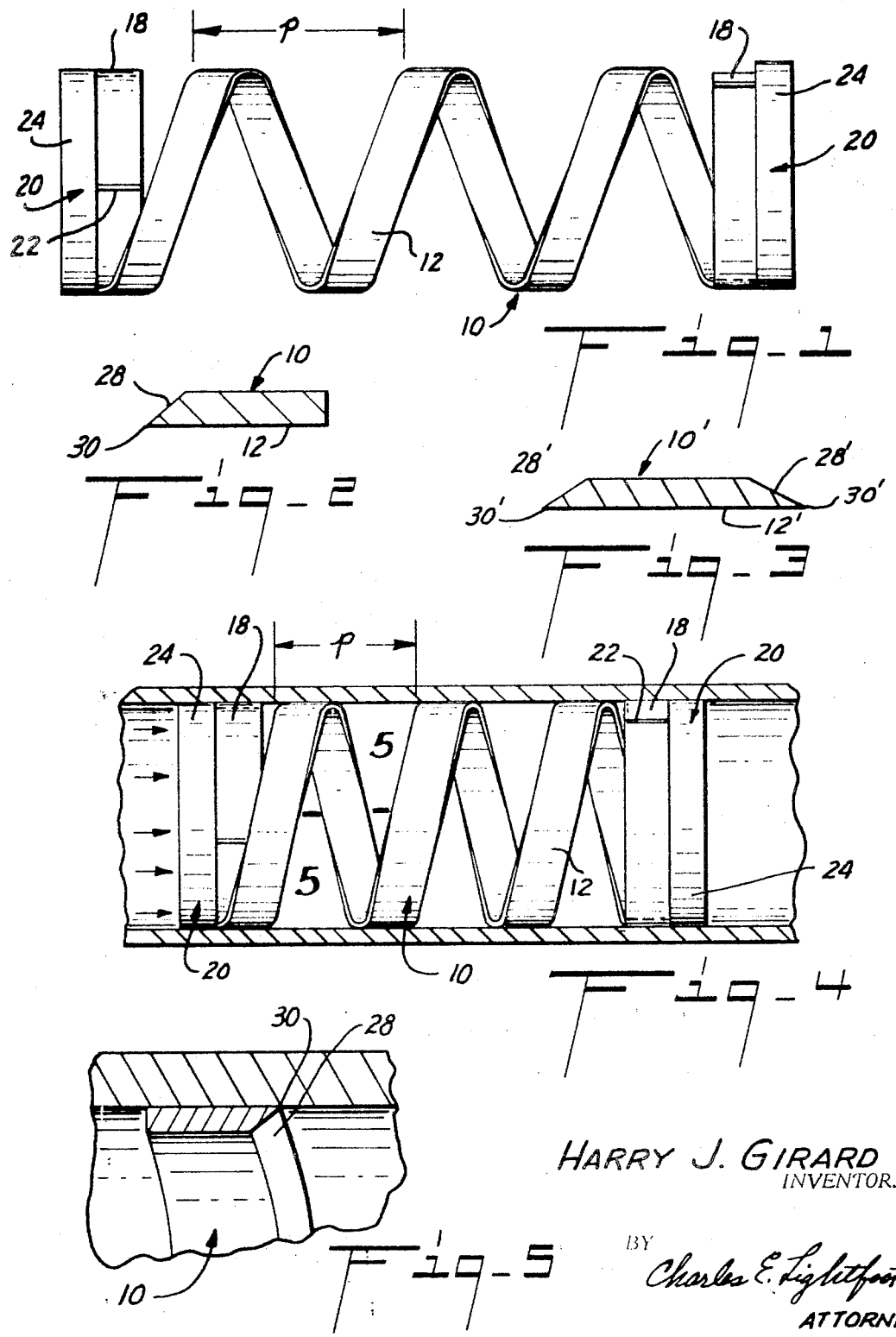

3,460,180
INTERNAL CLEANING DEVICE FOR PIPE LINES
Harry J. Girard, Houston, Tex., assignor of one-half to
Mary M. Knapp, Houston, Tex.
Filed June 15, 1967, Ser. No. 646,318
Int. Cl. B08b 9/02
U.S. Cl. 15—104.06                        2 Claims

ABSTRACT OF THE DISCLOSURE

A pipe line cleaning device to be propelled through a pipe line by a pressure differential therein and including a helically coiled spring-like scraping member shaped for scraping contact with the internal surface of the pipe, and seal forming elements at the ends of the coil positioned for sealing contact with the internal surface of the pipe, whereby a compressive force is exerted on the coil by the pressure of fluid flowing in the line to increase the radial force of the coil on the pipe. The coil is preferably formed with a cutting edge positioned to scrape the internal surface of the pipe to cut away accumulated foreign material thereon.

---

This invention relates to pipe line cleaning devices and more particularly to a pipe line pig or scraper which is designed to be propelled through the line by the pressure of fluid flowing therethrough.

In the operation and maintenance of pipe lines, it is customary to make use of pipe line pigs which are inserted in the line into sealing contact with the internal surface of the pipe to separate fluids of different character which are being transmitted through the line, such pigs being propelled through the line by the line pressure and being usually of a more or less flexible and compressible nature, so that they are compressed into tight sealing contact with the pipe by the pressure differential in the line and may readily pass through irregularly shaped portions and bends. Such pigs also serve to wipe or clean the internal surface of the pipe and are sometimes provided with abrasive surfaces disposed to remove corrosion or other foreign matter from the pipe.

The present invention has for an important object the provision of a pipe line cleaning device which is designed to be propelled through the line by line pressure and which has a cutting edge positioned for scraping contact with the internal surface of the pipe throughout the entire inner periphery thereof to cut away corrosion or other accumulated foreign matter and effectively clean the pipe.

Another object of the invention is to provide a pipe line cleaning device having a cutting or scraping member which is designed to exert a radial force against the internal surface of the pipe which increases with the differential of pressure exerted on the device by the fluid flowing through the pipe.

A further object of the invention is the provision of a pipe line cleaning device which is constructed to retain foreign matter removed from the internal surface of the pipe and prevent the same from contaminating the fluid which is being transmitted through the line.

Another object of the invention is to provide a pipe line cleaning device embodying a scraping or cutting member in the form of a helical coil having a cutting edge and including means for applying a longitudinal compressive force to the coil during propulsion of the same through the line to expand the coil radially to increase the scraping or cutting effect of the member on the internal surface of the pipe.

A still further object of the invention is the provision of a pipe line cleaning device of the character referred to which is flexible and which may readily pass irregularities in or about curved portions of a pipe line, but which is of rugged construction, capable of withstanding the extreme conditions of wear customarily encountered in the use of such equipment.

Briefly described, the cleaning device of the invention comprises a cutting or scraping member in the form of a coil spring having a helical cutting or scraping edge portion disposed for engagement with the internal surface of a pipe when the device is inserted therein and provided at its ends with seal forming elements of disc or plug-like character which are designed for sealing engagement with the internal surface of the pipe to cause the device to be propelled through the line by line pressure and to exert a compressive force on the member to expand the member radially into close scraping contact with the pipe.

The objects and advantages of the invention may best be understood from the following detailed description, constituting a specification of the same, when considered with the annexed drawings, wherein:

FIGURE 1 is a side elevational view of a preferred embodiment of the invention, showing the same in an extended condition before insertion into a pipe line which is to be cleaned;

FIGURE 2 is a cross-sectional view, on an enlarged scale of a preferred form of the scraping or cutting member of the invention;

FIGURE 3 is a view, similar to that of FIGURE 2, illustrating a somewhat different form of the scraping or cutting member;

FIGURE 4 is a side elevational view showing the cleaning device of the invention inserted in a pipe line and illustrating the manner in which the same functions in cleaning a pipe; and FIGURE 5 is a cross-sectional view, on an enlarged scale, taken along the line 5—5 of FIGURE 4, looking in the direction indicated by the arrows.

Referring now to the drawings in greater detail the pipe line cleaning device of the invention, as illustrated herein comprises a cutting or scraping member 10, which may take the form of a helical coil or spring of suitable material, such as hardened steel of flat strip or ribbon-like character, having an outer, longitudinally extending helical face 12, and provided with at least one helical cutting or scraping edge.

The coil 10 is preferably formed at each end with a cylindrically shaped, ring portion 18 for the insertion of the steel forming elements 20. The ring portions 18, may be of open-ended construction, as shown at 22, to allow these portions to expand somewhat for the insertion of the elements 20, so that the elements will be gripped by contraction of the rings to securely hold the elements attached to the spring member.

The seal forming elements 20 are of plug-like character formed of suitable resilient material, such as rubber, plastics, or the like, and having outer end portions 24 which are at least as large in diameter as the external diameter of the member 10 in its extended condition, which portions are designed for tight, seal forming engagement with the internal surface of the pipe to be cleaned. The elements 20 also have inner end portions 26 of smaller diameter than the portions 24 and which are fitted into the ring portions 18 of the member 10.

As shown in FIGURE 2, the member 10 may have a bevelled helical face 28 forming a more or less sharpened, helical cutting edge 14, or the member may be shaped as illustrated in FIGURE 3 with a bevelled face 28' along each edge to provide cutting edges 30'. It will, of course, be understood that the member 10 may be of other cross-sectional shape than those illustrated, such as rectangular, without the bevelled faces 28 or 28'.

It is contemplated that the helical member 10 may have an external diameter equal to or even somewhat larger than the internal diameter of the pipe to be cleaned, while the diameter of the portion 24 of the plugs 20 will be sufficiently large to tightly fit the pipe to form a fluid tight seal therewith.

In making use of the cleaning device, the device is inserted in the pipe with the cutting edge 30 or 30' directed forwardly, as seen in FIGURE 5, and the elements 20 in sealing engagement with the internal surface of the pipe. In the event that the member 10 has a tight fit with the internal surface of the pipe, the device may readily be rotated in a direction to screw the coil into the pipe, or the member may be wound up somewhat to reduce the external diameter of the coil to facilitate insertion. The member 10 may, of course, be stretched longitudinally, if necessary, to reduce its external diameter to fit the pipe.

With the device thus inserted in the pipe, fluid under pressure may be introduced behind the same to propel the device through the pipe.

During movement of the cleaning pig through the pipe, the difference in the pressure of the fluid in front of the pig and that at the rear of the same will tend to compress the coil longitudinally, thus increasing the radial force exerted by the coil against the internal face of the pipe to augment the cutting or scraping effect of the device. The radial force thus exerted will tend to hold the outer face 12 or 12' of the coil in close contact with the internal surface of the pipe, so that the advancing edge of the coil will effectively cut away foreign matter which has accumulated thereon.

Material removed from the internal wall of the pipe will be retained within the device between the elements 20, so that contamination of the fluid being transmitted is prevented. Should the device become completely filled with material cleaned from the pipe, any escape of such material will tend to take place past the forward one of the seal forming elements 20, so that contamination of the fluid behind the device which is being transmitted through the line will be prevented.

The seal forming elements 20 may, of course, take other forms than that described above, and these elements may be of solid construction, provided with any suitable seal forming means, such as seal rings or layers of seal forming material applied to the periphery of a solid central core. Because of the shouldering of the elements 20 against the end rings 18 of the coil, the seal forming elements are held against deformation by the pressure of fluid in the line, thus preventing leakage past the elements.

It will thus be seen that the invention constructed and used as described above provides a cleaning device for pipe lines, which is of simple design and rugged construction, and which operates by the pressure of the fluid flowing through the line to scrape and clean the internal surface of the pipe.

Having thus clearly shown and described the invention, what is claimed as new and desired to be secured by Letters Patent is:

1. In a pipe line cleaning device to be propelled through a pipe line by a pressure differential
   (a) a pair of longitudinally spaced apart cylindrical bodies of a size to be inserted into a pipe line,
   (b) means on said bodies formed of resilient material positioned for sealing engagement with the surrounding wall of the pipe to close the pipe and
   (c) spirally shaped means positioned between and in engagement with the internal surface of the pipe along a spiral path extending from one to the other of said bodies, said spirally shaped means being formed at each end with an annular portion, and each of said bodies being formed with a portion of reduced diameter to fit within and providing an annular shoulder on the body positioned for endwise engagement with one of said annular portions.

2. The pipe line cleaning device as claimed in claim 1 wherein said spirally shaped means is of polygonal shape in cross section having an external face shaped for contact with the internal surface of the pipe throughout the length of said spirally shaped means.

References Cited

UNITED STATES PATENTS

| | | | |
|---|---|---|---|
| 813,739 | 2/1906 | Ross | 15—104.19 |
| 2,192,086 | 2/1940 | Kjerulff | 15—104.19 X |
| 2,739,368 | 3/1956 | McCall | 15—104.16 X |
| 2,810,143 | 10/1957 | Reynolds | 15—104.06 |

EDWARD L. ROBERTS, Primary Examiner

U.S. Cl. X.R.

15—104